June 13, 1950  R. J. MILLER  2,511,732
MOTION-PICTURE PROJECTOR FILM FEED
Original Filed June 16, 1942
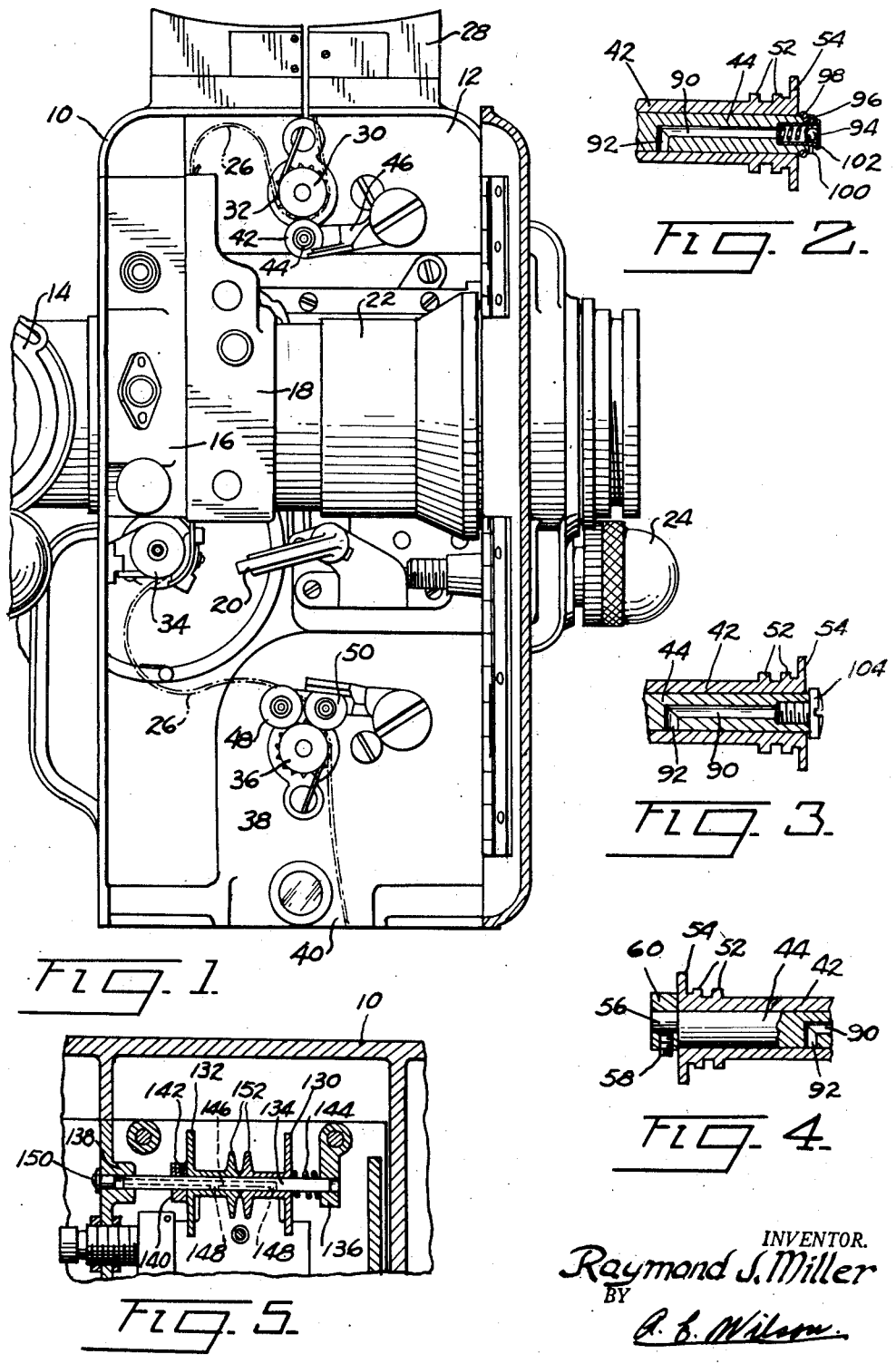
INVENTOR.
Raymond J. Miller
BY
*[signature]*

UNITED STATES PATENT OFFICE 2,511,732

MOTION-PICTURE PROJECTOR FILM FEED

Raymond J. Miller, Detroit, Mich., assignor to American Pattern and Manufacturing Co., a copartnership composed of Raymond J. Miller and Alfred E. Wilson, Detroit, Mich.

Original application June 16, 1942, Serial No. 447,251. Divided and this application October 2, 1944, Serial No. 556,683

3 Claims. (Cl. 271—2.3)

1

This invention relates to motion picture projectors and more particularly to improved means for lubricating film guide rollers.

An object of this invention is to provide improved means for lubricating guide rollers for motion picture projectors in such a manner that adequate lubrication is assured over substantially the entire length of the guide roller supporting member in such a manner that smoother running is assured and any excess oil is thrown off outside of the boundary of the film.

Another object is to provide improved guide rollers having internally disposed means for oiling the guide rollers in such a manner that oil is prevented from contacting the surface of the film passing through the projector.

Yet a still further object of the invention resides in the provision of improved guide roller assemblies having hollow roller supporting shafts whereby lubricant may be supplied to the surfaces between the rollers and shafts intermediate the length of the rollers to lubricate the guide rollers over their full length and whereby any excess oil will be thrown off outside of the marginal edges of the film by centrifugal force exerted on radially extending flanges carried by the guide rollers.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a side elevation partly in section of a motion picture projector embodying the present invention.

Fig. 2 is a fragmentary longitudinal sectional view of a guide roller and shaft assembly showing one desirable means of lubricating the guide roller.

Fig. 3 is a view similar to Fig. 2 showing a modified form of lubricating means.

Fig. 4 is a fragmentary longitudinal sectional view of an eccentric connection between a guide roller supporting shaft and a guide roller supporting arm.

Fig. 5 is a vertical sectional view illustrating film guide rollers positioned in the aperture plate.

Before explaining in detail the present invention it is to be understood that the invention

2 is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Fig. 1, the invention is illustrated as applied to a motion picture projector having a main case 10 preferably separated by an intermediate wall 12 into a film compartment and a mechanism compartment. A light source positioned behind a shutter housing 14 is adapted to direct light through the housing 14, and a rear aperture pressure plate housing 16 having an aperture therein to project successively spaced images from flexible strip film aligned with an aperture in the housing 16 positioned in the film compartment.

The film is yieldingly maintained in engagement with the members forming the aperture by a pressure plate 18. The aperture pressure plate 18 may be moved axially with reference to the aperture in the pressure plate housing 15 by means of a manually operable lever 20 to facilitate the threading of film into the projector. The projected images are magnified by a lens positioned in a suitable lens tube assembly 22 and are projected onto a screen positioned forwardly of the projector in such a manner as to be viewed. The lens assembly may be moved longitudinally relative to the aperture in the housing 16 to focus the projected images by means of a manually operably lens focusing member 24 projecting through the forward case of the housing 10.

Strip film 26 may be drawn from a suitable film magazine carried by a magazine adapter 28 and passed over an upper film driving sprocket 30 having a plurality of sprocket driving teeth 32. The film 26 is directed downwardly between the aperture pressure plate 18 and the housing 16. An intermittently driven sprocket 34 is provided to intermittently move the film to align successively spaced film frames with the aperture positioned in the housing 16 to permit projecting light to project the images therefrom to the screen. After passing beyond the intermittently driven sprocket 34 the film is directed over a lower driving sprocket 36 having suitable driving teeth 38 and is directed through an opening 40 in the bottom of the housing 10 to a sound head preferably positioned below the film compartment.

The film 26 may be maintained in contact with the driving teeth 32 of the sprocket 30 by means of a guide roller 42 mounted on a shaft 44 carried by an arm 46 adjustably fastened to the intermediate wall 12. The film 26 may be maintained in contact with the driving teeth 38 of the lower driving sprocket 36 by means of a guide roller assembly having spaced guide rollers 48 and 50 similar to the guide roller 42 of the upper assembly. It will be understood that a single guide roller may be used to maintain the film in driving contact with the lower sprocket 36 if desired and a plurality of guide rollers 42 may be employed to maintain the film in contact with the upper driving sprocket 30.

Since the guide rollers 42, 48 and 50 are substantially identical, only the upper guiding roller will be described in detail. The roller 42 is provided with longitudinally spaced flanges 52 positioned to straddle the driving teeth 32 on each side of the driving rollers to maintain the apertures positioned adjacent the edges of the film 26 in contact with the driving teeth 32 of the driving sprocket 30. The guide roller 42 is also provided with enlarged flanges 54 positioned adjacent its ends to lie outside the marginal edges of the film whereby excess lubricating oil will be thrown radially by centrifugal force outside of the marginal edges of the film.

The guide roller shaft 44 is as illustrated in Fig. 4 provided with an eccentric projection 56 adapted to be adjustably clamped by a locking screw 58 in an arm 60. The position of the guide roller 42 and the flanges 52 relative to the driving sprocket 30 and driving teeth 32 may be varied by oscillating the shaft 44 on its eccentric adjustment to increase or decrease the clearance between the guide roller and the driving sprocket.

Where a plurality of guide rollers are employed to guide the film with reference to a single driving sprocket such as the guide rollers 48 and 50, each guide roller may be individually adjusted on its associated eccentric shaft to vary its position relative to the other guide roller and relative to the driving sprocket.

As more clearly illustrated in Figs. 2 to 4, the shaft 44 is provided with an axially extending oiling duct 90 extending to approximately midway of the guide roller 42. The duct 90 communicates with a radially extending port 92 whereby oil may be applied to the inner surface of the roller 42 to lubricate the space between the roller 42 and shaft 44. Oil thus deposited flows axially in both directions to thoroughly lubricate the driving rollers and any excess oil is thrown off by the radially extending flanges 54 positioned outside of the marginal edges of the film 26.

As illustrated in Fig. 2, a ball check valve 94 yieldingly urged by a spring 96 may be provided to maintain lubricant within the port 90, the lubricant being supplied to the port 90 by depressing the ball 94. A snap ring 98 positioned in a groove adjacent the outer end of the shaft 44 may be provided to maintain the guide roller 42 on the shaft 44. A screw driver slot 100 may be provided to permit oscillation of the shaft 44 to adjust the eccentric projection 56 between the shaft 44 and the arm 60 to vary the spacing of the guide roller with reference to the driving sprocket. When it is desired to actuate the shaft 44 a pronged screw driver may engage the screw driver slot 100, or the ball and spring check valve may be countersunk to permit the use of a normal screw driver.

If desired, a screw 104 illustrated in Fig. 3 may be threaded into the outer end of the shaft 44 to maintain the guide roller 42 on the shaft and to maintain lubricant within the port 90.

Referring now to Fig. 5, it will be observed that guide rollers 130 and 132 are positioned in the housing 16 and are mounted on a shaft 134 journalled at one end in an arm 136 and a boss 138. The roller 132 is maintained against axial movement by means of a stop 140 clamped to the shaft 134 by a stud 142. The guide roller 130 is yieldingly urged toward the guide roller 132 by means of a spring 144. An internal port 146 terminating in radially extending openings 148 is provided to lubricate the space between the guide rollers 130 and 132 and the shaft 134, a ball check oil cup 150 being provided to close the outer end of the boss 138 in which shaft 134 is journalled. Radially extending flanges 152 carried by the rollers 130 and 132 are provided to discharge oil that seeps through the point between the rollers to prevent oil from travelling axially to get on the radially extended portions of the rollers 130 and 132 which engage the film.

This is a division of my copending application Serial No. 447,251 filed June 16, 1942, now Patent No. 2,423,334 issued July 1, 1947, which was a continuation in-part of my previously filed application Serial No. 250,310, filed January 11, 1939, now Patent No. 2,312,663 issued March 2, 1943.

I claim:

1. In a motion picture projector having a film driving roller including axially spaced radially extended film driving teeth to project into apertures positioned adjacent the edges of film, a film guide roller assembly associated with the film driving roller and comprising a shaft, an arm supporting the shaft and movable angularly to locate the shaft between positions adjacent and spaced from the film driving roller, the shaft having an axially extending lubricating bore intersecting a radial lubricating bore extending into the shaft intermediate the length of the shaft, a guide roller rotatably mounted on the shaft to overlie the radial lubricating bore, longitudinally spaced flanges carried by the guide roller to straddle the film driving teeth of the film driving roller, enlarged flanges positioned adjacent the ends of the film guide roller whereby excess lubricating oil discharged from the radial lubricating bore of the shaft will be thrown off radially by centrifugal force outside the marginal edges of the film, the film guide roller being uninterrupted between said enlarged flanges to prevent the escape of oil from the guide roller between said enlarged flanges, and a removable plug for closing the axially extending lubricating bore of the shaft.

2. In a motion picture projector having a film driving roller, a film guide roller assembly associated with the film driving roller and comprising a shaft, an arm carrying the shaft and movable angularly to locate the shaft between positions adjacent and spaced from the film driving roller, a film guide roller rotatably mounted on the shaft, said shaft having an axially extending lubricating bore intersecting a radial lubricating bore extending into the shaft intermediate the length of the shaft, the guide roller being positioned on the shaft to overlie the radial lubricating bore, and enlarged flanges positioned adjacent the ends of the film guide roller whereby excess lubricating oil discharged from the radial lubricating bore of the shaft will be thrown off radially by centrifugal force outside the marginal edges of the film, the guide roller being uninterrupted between said enlarged flanges to prevent the escape of oil between said enlarged flanges.

3. In a motion picture projector having a film driving roller, a film guide roller assembly associated with the film driving roller and comprising a shaft, an arm supporting the shaft and movable angularly to locate the shaft between positions adjacent and spaced from the film driving roller, a guide roller rotatably mounted on the shaft, means to deposit lubricating oil between the shaft and the guide roller, and enlarged flanges positioned adjacent the ends of the film guide roller whereby excess lubricating oil deposited between the shaft and guide roller will be thrown off radially by centrifugal force outside the marginal edges of the film, the film guide roller being uninterrupted between said enlarged flanges to prevent the escape of oil from the guide roller between said enlarged flanges.

RAYMOND J. MILLER.

REFERENCES CITED

The following references are of record in the file of this patent:

UNITED STATES PATENTS

| Number | Name | Date |
| --- | --- | --- |
| 1,854,004 | Tschopp | Apr. 12, 1932 |
| 1,957,164 | Frappier et al. | May 1, 1934 |
| 1,961,471 | Wright | June 5, 1934 |
| 2,418,544 | Collins | Apr. 8, 1947 |

FOREIGN PATENTS

| Number | Country | Date |
| --- | --- | --- |
| 486,804 | Germany | Nov. 27, 1929 |
| 376,868 | Great Britain | July 21, 1932 |